March 15, 1932. G. HEUWING 1,849,799
INVERTIBLE TRAY MECHANISM FOR BAKE OVENS
Filed June 21, 1930
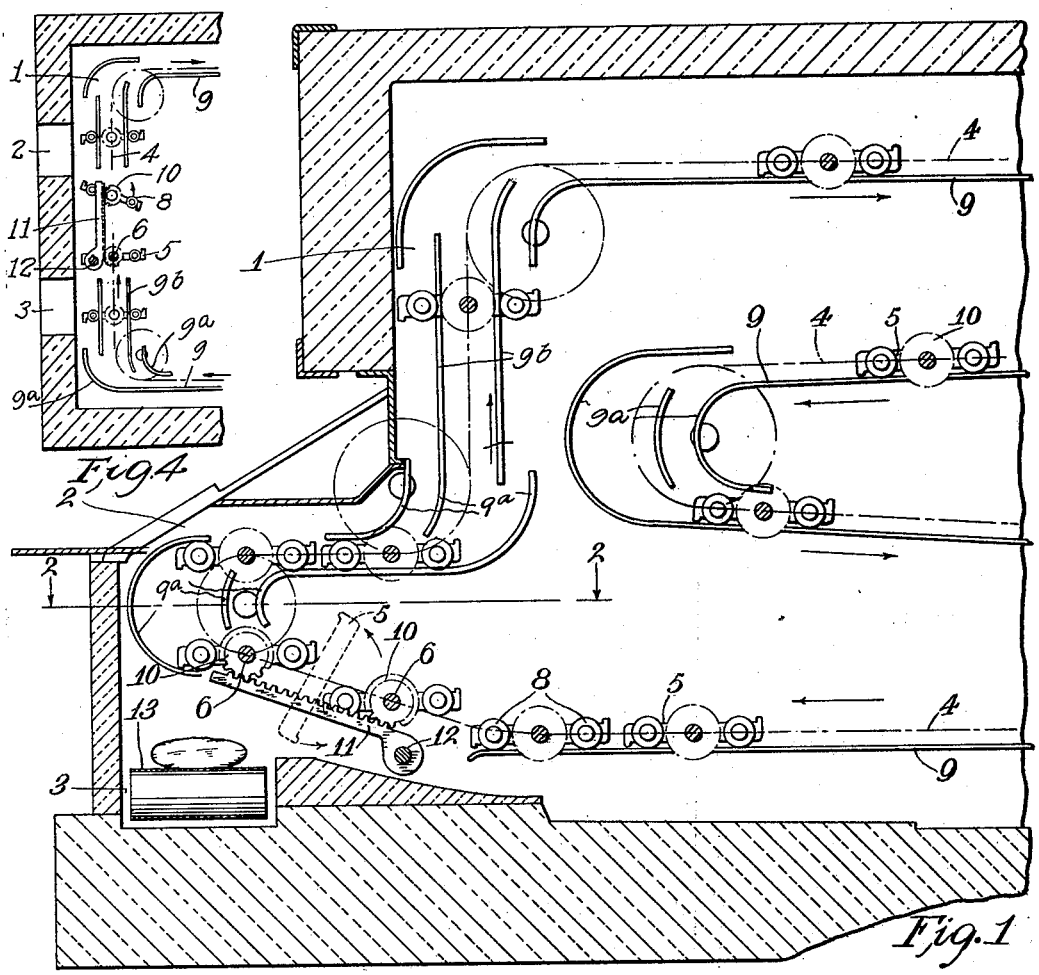
Fig.4
Fig.1
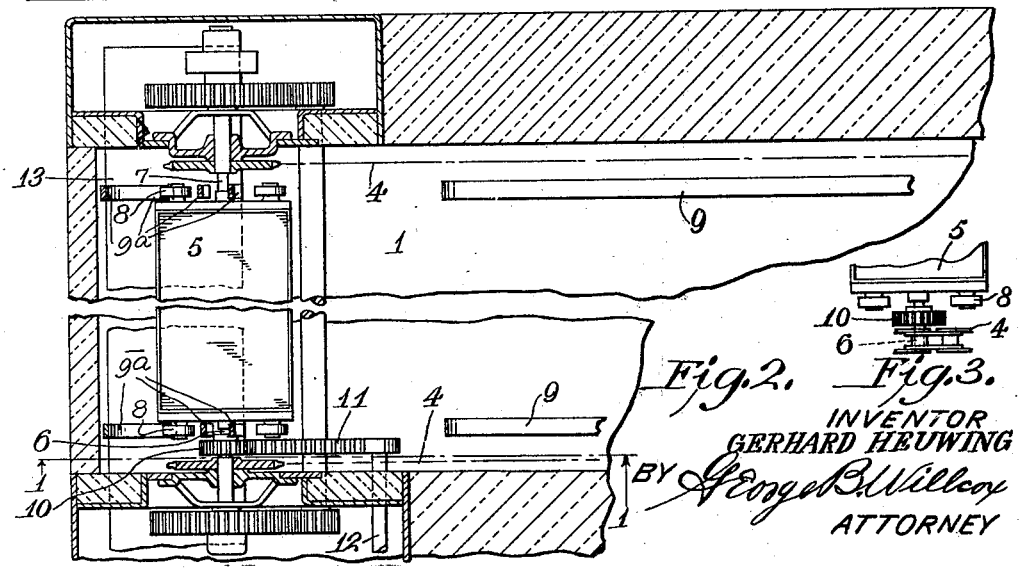
Fig.2. Fig.3.
INVENTOR
GERHARD HEUWING
BY George B. Willcox
ATTORNEY Patented Mar. 15, 1932

1,849,799

UNITED STATES PATENT OFFICE

GERHARD HEUWING, OF STUTTGART-CANNSTATT, GERMANY, ASSIGNOR TO BAKER PERKINS COMPANY, INC., OF SAGINAW, MICHIGAN, A CORPORATION OF NEW YORK

INVERTIBLE TRAY MECHANISM FOR BAKE OVENS

Application filed June 21, 1930, Serial No. 462,911, and in Germany June 25, 1929.

This invention relates to traveling-tray ovens which have trays or tray-bottoms of soapstone or other non-metallic material having low heat-conductivity.

It has for its object the provision of a tray of such material which will present a baking surface evenly heated to a high temperature, for loading with fresh loaves and thus eliminate the detrimental effect on the goods caused by a baking surface which has been cooled by contact with the previously baked loaves, especially in ovens wherein the trays are unloaded and immediately reloaded.

This invention relates to the production of all classes of baked goods, but more particularly to the baking of hearth breads, the loaves of which are deposited directly on the floor or hearth of the oven, or in traveling ovens, directly on the plates or trays of the conveyor. It is the general opinion of bakers that the best material on which to bake such bread is one having a high thermal capacity, such as thick soapstone, or one of several artificial cements having similar properties. This type of material provides what is known as a "bland" heat, steady and uniform throughout the plate. Due to its high thermal capacity, the depositing of a cool, raw loaf does not produce as large a drop of temperature in a soapstone tray as it does in a metal hearth, plate or tray. And on account of the slow speed at which heat travels through the material, the temperature of a soapstone or similar tray will not fluctuate rapidly, as does the temperature of a metal tray, when the tray passes over or in proximity to a burner or other heating element.

Thus in most types of ovens it is an advantageous characteristic of baking surfaces of soapstone and like substances, that their interior heat-conductivity is low, but in a traveling tray oven, where a tray is reloaded immediately after unloading, this same characteristic introduces a pronounced difficulty. This is due to the fact that the baking surface will have been cooled locally by the bread just removed, and will not be reheated rapidly enough to the desired even temperature by conduction from the body of the tray.

By my invention I overcome this difficulty in a novel manner. It comprises a double-faced tray or tray-bottom member, carried by the customary conveyor chains, which is revoluble about its longitudinal axis relative to the conveyor chain. During its passage through the baking passes of the oven it is guided or otherwise caused to maintain a horizontal position. However, just before the tray reaches the loading station of the oven it is freed to revolve, and at this point I provide means for revolving it one-half turn and reversing the surfaces. Thus a surface evenly heated to the proper temperature is ready to receive the raw loaves to be baked thereon.

The construction, installation and mode of operation of this improved oven tray and the associated mechanism for inverting it will now be described.

Referring to the drawings, Fig. 1 is a sectional side elevation of the loading end of an oven embodying the preferred form of my invention.

Fig. 2 is a sectional plan view taken along line 2—2 of Fig. 1.

Fig. 3 is a plan view of one end of a tray, showing its connection to the conveyor chain.

Fig. 4 is a sectional side elevation showing the application of my invention to a modified form of oven.

An oven 1 of known form, having at one end a loading station or feed opening 2 and an unloading station 3, is provided with a conveyor comprising a pair of conveyor chains 4, carrying between them trays 5, which travel a circuitous path through a plurality of baking passes, returning for unloading to the same end of the oven at which they were loaded. The trays 5 are made from thick soapstone slabs suitably mounted in metal frames and are provided with smooth baking surfaces on both sides. Each tray has fixed pivot shafts 6 and 7 located at either end of its central longitudinal axis. These shafts are journaled in the conveyor chains 4, as shown in Fig. 3, so that the tray is revoluble with respect to the chains.

Each plate or tray 5 is provided with a pair of guide rollers 8 on each end which travel on tracks 9 extending through the horizontal passes of the oven to keep the trays from tilting. A system of gearing, not shown, is employed for guiding the trays around the oven conveyor sprockets in an upright position. As is apparent in the drawings, the guide tracks 9 are interrupted at the point where the trays are to be turned over.

Pivot shaft 6 of each tray 5 carries a pinion 10 fixed relative to the tray. A rack 11 is positioned to be engaged by pinion 10, and its toothed section is just long enough to cause the pinion to rotate one-half revolution and invert the tray as it moves along and over the track. The rack is located to invert the trays just before they reach the feed opening of the chain.

Rack 11 is fixed at one end to a shaft 12 which is journaled in and passes through the oven wall. A lever (not shown) on the outer end of shaft 12 serves to raise and lower the rack to and from its operative position and to lock it in place. When it is desired to use the oven without inverting the trays, rack 11 is lowered out of its pinion-engaging position and hinged track sections (not shown) are swung into place to close up the interruption in the guide tracks 9.

In the specific embodiment of my invention shown in the drawings the rotation of the trays effects the discharge of the baked loaves onto a cross conveyor 13 at unloading station 3 of the oven, which carries them out of the oven.

In the operation of this oven loaves of dough are placed on a tray as it passes the loading station 2, it traverses the various runs or baking passes of the oven, which are heated in any suitable way, and return to the same end of the oven. Here the pinion 10 engages with the rack 11 and the tray is turned over, discharging the baked bread onto conveyor 13. The surface of the soapstone tray 5 from which the bread has just been removed, will now be unevenly heated, having cooler spots where the loaves have been resting. Due to the low heat-conducting ability of soapstone, the heat from the hotter portions of the tray which were not in contact with the goods being baked, will not spread through the body of the tray and restore an even temperature to its surface before the tray must be reloaded. Consequently the next batch of loaves baked on this same tray-surface can not be as uniform in appearance or quality as the first which was baked on an evenly preheated surface, unless a time interval is introduced between the unloading of one batch and the loading of the next, to allow heat to spread evenly through the tray. This time interval is available in traveling plate ovens, the conveyor plates of which return empty from the discharge end to the feed end. This is not so in the case of tray ovens, however, in which the trays carry goods throughout their entire baking travel, since the loading and unloading operations are performed nearly simultaneously at the same end of the oven.

However, because of this low heat conductance, the bottom surface of the soapstone tray has not been cooled in spots by the loaves just baked on the top surface, and has been accumulating heat from the oven atmosphere. By my simple invention I bring this evenly heated surface uppermost to receive the next loaves to be baked, and each loaf enters upon the most critical period of its baking under the proper conditions of bottom heat, uniform with the baking conditions for every other loaf.

I do not intend to limit myself to the particular form of mechanism which I have disclosed and described. For example, the stationary rack which I have employed to engage a pinion on each tray may be replaced by a moving mechanism for positively turning over each tray. This would be useful in the event that trays of the swinging type pivotally mounted in frames suspended from the conveyor chains, were to be used.

Nor do I desire to limit myself to the particular method of loaf discharge shown. In an oven for baking goods in pans it would be preferable to have an unloading aperture in the end wall of the oven below and corresponding to the loading aperture 2. A vertical run of the conveyor would then carry the trays upwardly past these openings, and the rack 11 would then be vertical and located between the two openings. The baked goods would then be removed manually from a tray at the lower opening, the tray would travel upward and be turned over, and would then be reloaded at the upper loading aperture.

Having thus described my invention, what I claim and desire to secure by Letters Patent is:

1. In a bake oven, a conveyor comprising a pair of endless chains one at each side of the oven, traversing a plurality of heated baking passes therein, an unloading station and a loading station in close proximity to each other in the same end portion of the oven, a plurality of soapstone trays carried by said chains, each tray having two baking faces, each of said trays journaled to the chain at each of its ends and capable of complete rotation about its longitudinal axis, a pinion fixed to each tray coaxially with said longitudinal axis, guides for maintaining the trays horizontal during their passage from the loading to the unloading stations, a stationary rack located in the path of travel of said pinions after the unloading station and before said loading station, the length of said rack being sufficient to rotate each pinion and its tray one-half revolution.

2. In a bake oven, a conveyor comprising a pair of endless chains, one at each side of the oven, traveling therethrough in a closed circuit and traversing a plurality of heated baking passes, a plurality of trays, each with two baking faces and made of material having low heat-conductivity, said trays carried by said conveyor, each tray pivotally connected to the chains so as to be capable of complete rotation about its longitudinal axis, a pinion fixed to each tray coaxially with said longitudinal axis, a loading station in the wall of the oven, means for maintaining the trays horizontal during their travel from the loading station through said baking passes, a stationary rack located in the path of travel of and arranged to engage each pinion before its tray reaches said loading station, the length of the rack being such as to cause each tray to rotate one-half turn as it travels along said rack.

3. In a bake oven, a conveyor traveling therethrough in a closed circuit, said conveyor comprising a pair of endless chains, a plurality of non-metallic trays carried by said chains, each tray having two baking faces, each tray pivotally mounted at each end so as to be capable of rotary movement about its longitudinal axis, a loading opening in the wall of the oven giving access to said trays on the conveyor, means operatively engageable with each tray and arranged to rotate the tray one-half revolution shortly before it reaches said loading opening.

4. In a bake oven, a loading station in a wall thereof, a plurality of invertible non-metallic trays, each tray having two baking faces, means for transporting said trays from said loading station while maintaining each tray with the same face up until it reaches a place in advance of said loading station, and means for inverting each tray at such place to present its other face at said loading station.

In testimony whereof, I affix my signature.

GERHARD HEUWING.